Nov. 7, 1961 B. VER NOOY 3,007,355
TAPPING MACHINE
Filed May 19, 1958 3 Sheets-Sheet 3

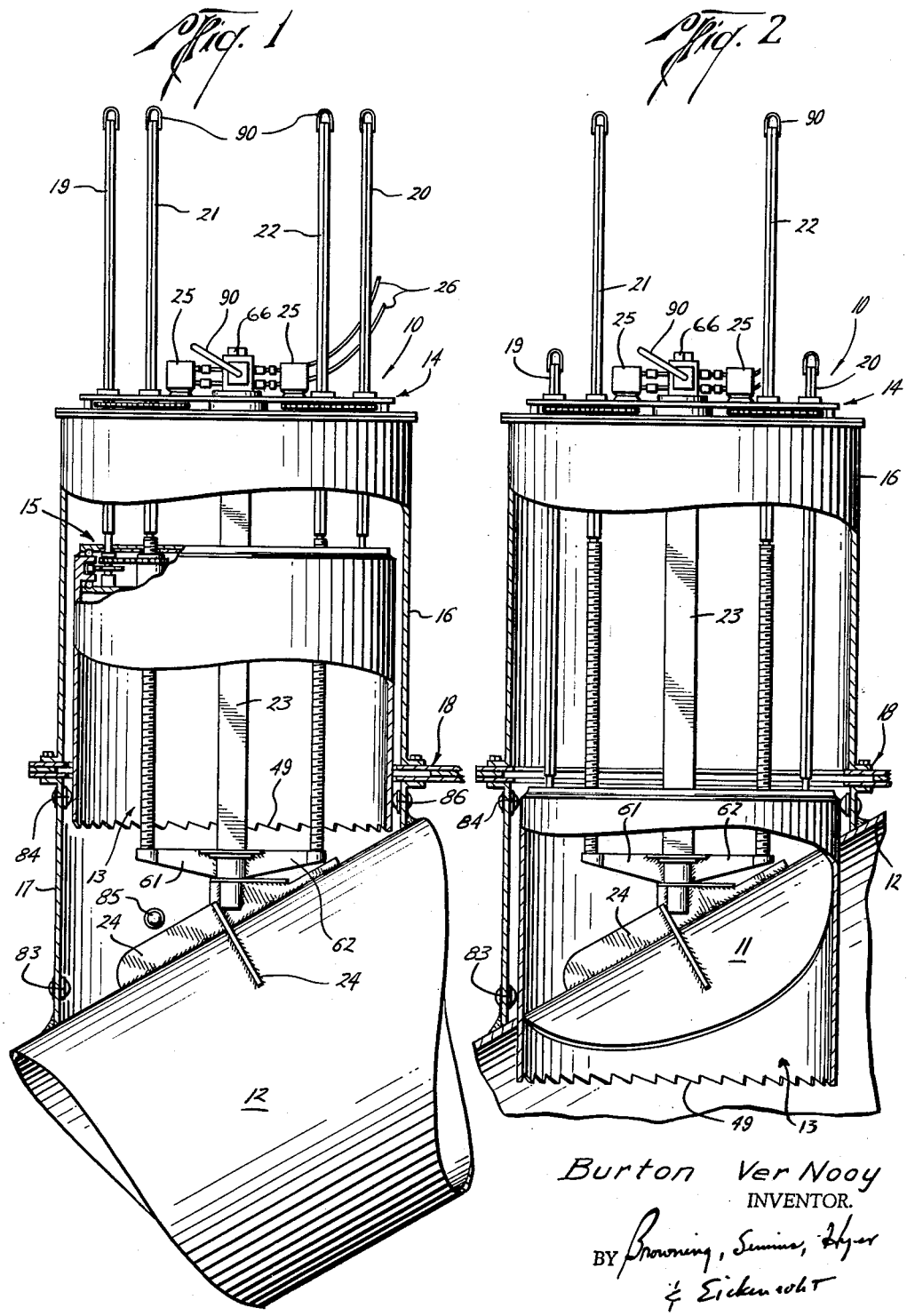

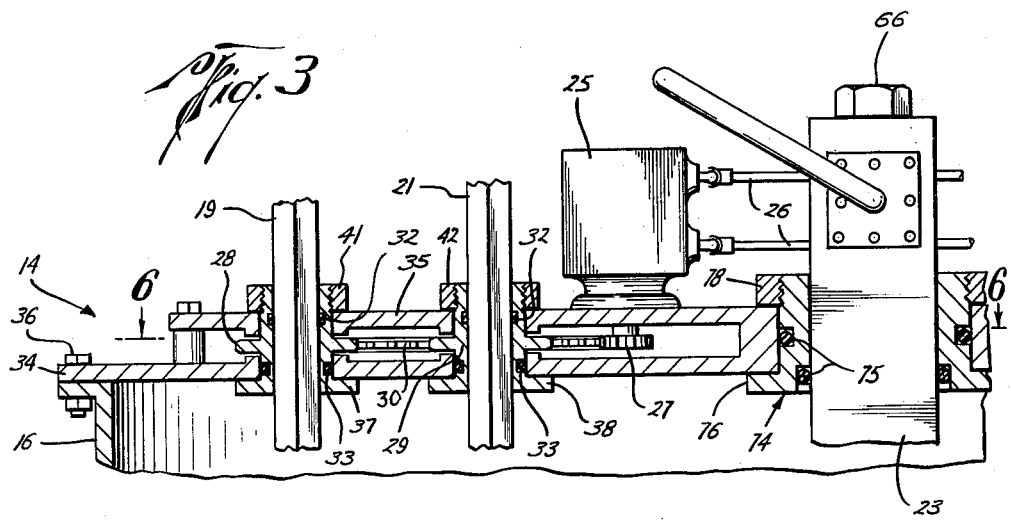
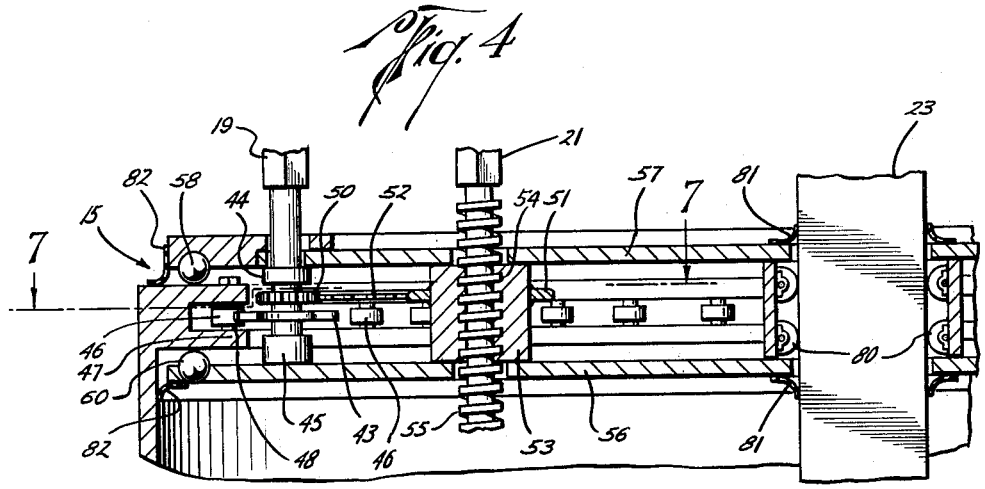
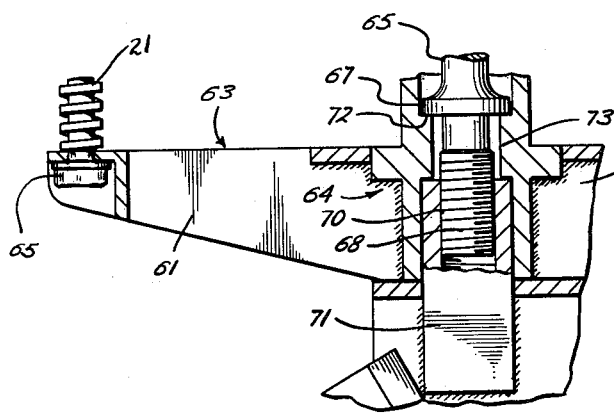

Burton Ver Nooy
INVENTOR.

BY Browning, Simms, Hyer
& Eickenroht

ATTORNEYS

United States Patent Office 3,007,355
Patented Nov. 7, 1961

3,007,355
TAPPING MACHINE
Burton ver Nooy, Tulsa, Okla., assignor to
T. D. Williamson, Inc., Tulsa, Okla.
Filed May 19, 1958, Ser. No. 736,283
17 Claims. (Cl. 77—38)

This invention relates, in general, to tapping machines for cutting holes in pipelines, pressure tanks, and the like, which contain fluid, the loss of which is not desired. In one of its more specific aspects, it relates to a new and improved tapping machine especially adaptable for such pipelines, pressure tanks and the like having relatively thin walls and also for making angular taps.

A general object of this invention is a provision of a new and improved tapping machine so constructed and arranged that at least some of the force of the cutting operation is transferred to the coupon being cut from the pipeline, etc.

Tapping machines useable for tapping pipelines or the like in operation and under pressure, usually have a fluid tight housing which is connected to a T or nipple welded to the wall of the pipe. In this type of prior art machines, the torque required to operate the cutter as well as the feeding and pulling stresses thereof were transferred via the housing to the T and thence to the pipe. While this type of machine is satisfactory for certain applications, it is deficient for other applications particularly those where the tapping machine housing must be thin-walled due to size. Such a thin-walled housing is not capable of withstanding the cutting torque and feed stresses developed in the cutting operation.

Accordingly, a more particular object of this invention is a provision of a new and improved tapping machine whereby a relatively thin walled nipple may be suitably affixed to a pipeline or the like and the transfer of torque as well as the pulling and feeding stresses from the cutter of the machine are not substantially transferred to the thin walled nipple. The term "thin walled" will be meant to include those nipples the wall thickness of which is designed primarily to withstand the fluid pressure to which the nipple will be exposed. The wall thickness need not be designed to also withstand the torque and feeding stresses of the cutting operation in addition to the stresses imposed by fluid pressure. Hence, the term is a relative one. Moreover, while the tapping machine of this invention is particularly adapted for use with such relatively thin walled nipples, it can be used with nipples of a wall thickness of any desired thickness beyond that required to withstand fluid pressure.

These general and particular objects are accomplished by connecting the cutter of the tapping machine to a suitable anchor mechanism attached to the coupon to be cut from the pipe or the like. The arrangement is such that either or both of the torque, generated by the cutting operation of the cutter acting on the pipe and the feeding and pulling stresses thereof, are transferred through the anchor mechanism to the coupon. In this matter, the relatively thin walled nipple may be used merely to guide the cutter in the cutting operation and is not necessarily subject to torque or pulling and feeding stresses.

In the embodiment disclosed, it has been found by this arrangement of the cutter and anchor mechanism, together with means guiding the cutter towards the pipe, that a starting or pilot cutter, found in conventional tapping machines of this type, can be eliminated, and it has also been found that the use of the conventional starter or pilot cutters for retracting the coupon after it has been cut is no longer necessary since the anchor mechanism of this machine will perform that function.

Accordingly, still another particular object of this invention is a new and improved tapping machine so constructed and arranged whereby a pilot drill is not necessary either to orient the cutter or to recover the coupon.

Another object is to provide a tapping machine in which a torque transmitting means can be fastened to an anchor which has been previously fixed to the coupon to be cut from a container thereby facilitating mounting the tapping machine in operable position and also providing for its initial connection to the coupon.

Other and additional objects of this invention will be apparent to those skilled in the art from the following description and drawings forming a part hereof and wherein:

FIG. 1 is an elevational view, partially broken away, illustrating a tapping machine constructed in accordance with this invention mounted on a pipeline and showing to advantage the cutter with its supporting mechanism and driving mechanism ready to begin a tapping operation;

FIG. 2 is an elevational view, partially broken away, of the tapping machine shown in FIG. 1 after the cutter has penetrated the pipeline and cut the coupon therefrom;

FIG. 3 is an enlarged detail sectional view illustrating to advantage a portion of the driving mechanism in the power flange assembly to actuate the drive and feed shafts of the tapping machine illustrated in FIGS. 1 and 2;

FIG. 4 is an enlarged detail sectional view illustrating to advantage a portion of the ring gear sprocket arrangement of the cutter in a torque plate assembly cooperating with the drive and feed shafts illustrated in FIG. 3;

FIG. 5 is an enlarged detail sectional view of the anchor for the anchor mechanism of the tapping machine illustrated in FIGS. 1 and 2;

Figure 6:
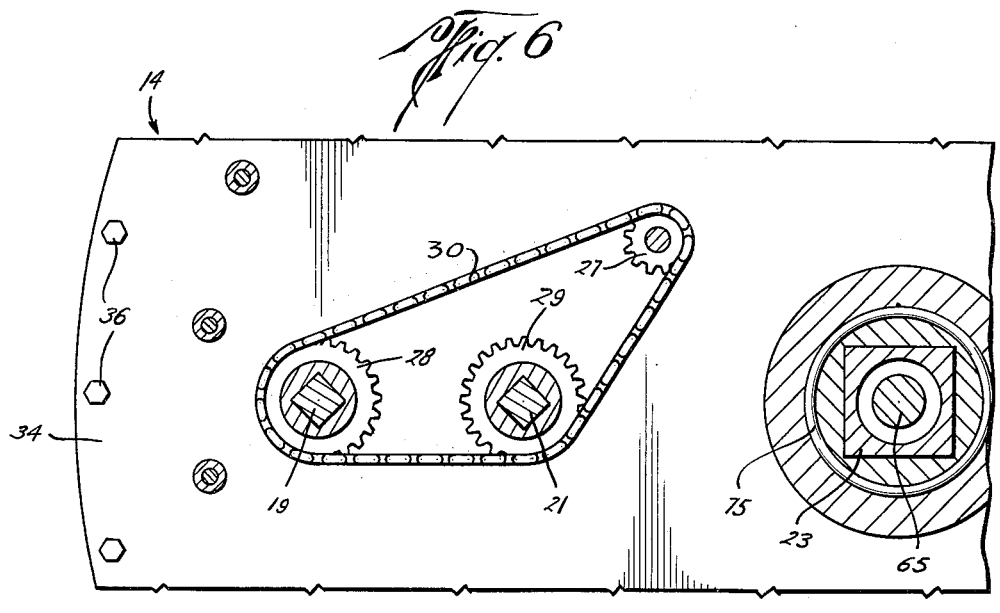
FIG. 6 is a view on the line 6—6 of FIG. 3 showing the power drive arrangement for the cutter drive and feed shafts.
Figure 7:
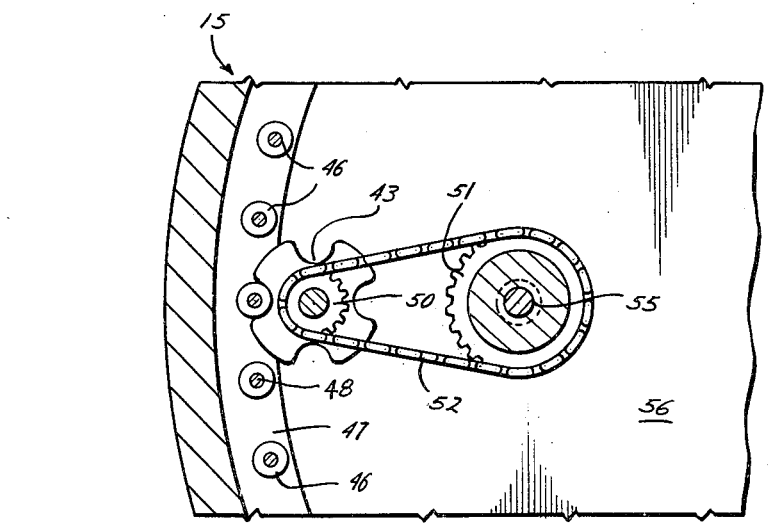
FIG. 7 is a view on the line 7—7 of FIG. 4 showing further details of the cutter drive and feed assembly.

Turning now to FIGS. 1 and 2 of the drawings, there is illustrated a new and improved tapping machine, designated in its entirety as 10, in operative position to cut a coupon 11 from a pipe 12. The tapping machine 10 comprises, generally, a cylindrical cutter 13 rotatably driven and fed by a power mechanism which includes a power flange assembly 14 and a torque flange assembly 15. The cutter is enclosed within a shell or housing 16 which in turn is mounted on a nipple 17 welded to pipe 12 and which encompasses and encloses an area from which coupon 11 is to be cut. The shell 16 is suitably flanged at one end to cooperate in fluid tight relationship directly with the power flanged assembly 14 and at the other end for fastening to a valve 18 and with a flange on one end of the nipple 17 in conventional manner. The other end of the nipple can be formed to complement the curvature of the pipe as illustrated. The power assembly 14 serves to operate, in this embodiment, a pair of drive shafts 19 and 20 and a pair of feed shafts 21 and 22, all of which cooperate with a torque plate assembly, illustrated in its entirety as 15, to rotate the cylindrical cutter 13 and move it toward the pipe 12 to cut the coupon 11, as illustrated in FIG. 2. The cylindrical cutter 13 and the torque plate assembly 15, together with the feed shafts 21 and 22, are operatively mounted on and supported by a centrally located torque member 23 or support mechanism, which in turn is suitably fastened or anchored to an X-shaped anchor 24, welded or otherwise suitably affixed to the area from which the coupon is to be cut, as illustrated.

Turning now to FIGS. 3, 4 and 5, it can be seen that the power flange assembly 14 comprises a plurality of fluid motors, one shown and identified as 25 in FIG. 3, actuated by a source of fluid power (not shown) in communication therewith by a pair of power and exhaust lines 26 to rotate a motor sprocket 27. The motor sprocket 27 is in driving relationship with a pair of driving and feeding sprockets 28 and 29 by a sprocket chain 30 and respectively transmits torque to the drive shaft 19 and feed shaft 21 to which they are respectively drivingly connected. These sprockets 28 and 29 are also provided with suitable sealing means, such as at 32 and 33, to form a fluid tight relationship with shafts 19 and 21 and also with flange plate 34. Flange plates 34 and 35 sandwich the sprockets 28 and 29 and the chain 30 therebetween but are spaced apart sufficiently to permit the operation of these sprockets. Plate 34 is also fixed to the shell 16 as by bolt 36 in fluid tight relationship. For ease of assembly, each driving and sealing sprocket is flanged at one end, as illustrated at 37 and 38, and suitably externally threaded at its other end to receive nuts 41 and 42 and to rotatably fix the sprocket between the two plates 34 and 35. And while shafts 17 and 20 have been shown as square in cross-section and receivable in a square bore in the sprockets 28 and 29 to effect the proper driving relationship therebetween, obviously, the square shafts and bores can be cylindrical with the shafts suitably keyed thereto to provide a non-rotation slidable connection between the shafts and sprockets.

The drive shaft 19 and feed shaft 21 are suitably detachably connected to the torque flange assembly 15, illustrated in more detail in FIG. 4. Drive shaft 19 is coupled to a drive sprocket 43 and suitably received in bearing means 44 and 45 for rotational movement. Drive sprocket 43 is, in turn, operatively connected with a plurality of rollers 46 evenly spaced about the periphery of the cutter and affixed to an inwardly extending bifurcated flange 47 on the top of the cylindrical cutter 13.

The bifurcations of the inwardly turned flange 47 are provided with sufficient clearance to permit the free rotation of the rollers 46 each of which is mounted on a pin 48 and so constructed and arranged whereby the respective teeth of the sprocket 43 interengage with them as teeth in a ring gear during rotation of the sprocket to rotate the cutter 13 whereby cutting teeth 49 (FIGS. 1 and 2) may perform the cutting operation on the pipe 12. Obviously, the roller arrangement 46 and 48 could be effectively replaced with a ring gear arrangement, if desired.

Drive shaft 19 is provided with still another and smaller sprocket 50 located near the sprocket 43 and which is drivingly connected to a sprocket 51 by a sprocket chain 52. Sprocket 51, in this embodiment, forms an integral part of a feed nut 53, internally threaded as at 54, to cooperate with the external threads 55 formed on the feed shaft 21. The entire assembly including the sprockets, rollers 46, bifurcated flange 47, as well as the feed nut 53, are suitably sandwiched between a pair of plates 56 and 57, yet spaced apart to permit operation. Suitable roller bearing means 58 and 60 are provided near the outer periphery of the plates 56 and 57 to permit free rotation of the cutter flange 47 and the plates are suitably apertured to permit the operation of the shafts 19 and 21.

As the fluid motor of the power flange assembly, shown in FIG. 3, rotates the drive and feed shafts 19 and 21 to rotate the cutter 13, the latter is moved or fed towards the pipe 12 at a pre-selected rate depending upon the pre-selected relationship between the various sprockets and the pitch of threads 55. Thus, the number of teeth on the various sprockets is chosen, for the illustrated arrangement, to be such that sprocket 51 is rotating slightly slower than sprocket 29 and yet sprocket 43 is rotating at sufficient speed to give the cutter its desired peripheral speed. The relative speeds of sprockets 29 and 51 and the pitch of the threads can be selected to be such that the net rotation between nut 53 and threads 55 will feed the cutter at the desired rate, as, for example, 0.006 inch per revolution of the cutter.

While FIGS. 3 and 4 show only one-half of the complete power and torque flange assemblies, it will be understood that the other half can be an essential duplicate thereof.

The square, hollow torque bar 23 is provided at the end nearest the pipe 12, as shown more clearly in FIG. 5, with a pair of radially outwardly extending arms 61 and 62, forming part of a yoke 63 suitably fixedly attached in any convenient manner to the torque tube 23 as by flange and notch arrangement, indicated in its entirety as 64. The outer extremities of the arms 61 and 62 are respectively rotatably connected to the feed shafts; feed shaft 21 being shown in FIG. 5 with its lower end fitted with a removable bearing 65 by which it is attached to arm 61.

As illustrated in FIGS. 3 and 5, the yoke 63 and torque tube are suitably anchored to the anchor 24 by a retainer rod 65 disposed within the torque tube and provided at one end with head 66 and at the other end with a radially outwardly extending flange 67 and external threads 68. The threads 68 are received within internal threads 70 of an anchor bar 71 suitably affixed to the anchor 24 and, with the flange 67 cooperating with a shoulder 72 formed by a reduced bore 73 in the torque tube 23, the entire assembly is suitably removably and non-rotatively anchored to the anchor 24.

As further illustrated in FIG. 3, a torque tube seal 74, having suitable sealing means 75 is located centrally of the two flanges 34 and 35 of the power flange assembly 14. For ease of assembly, shaft seal 14 further flanged at one end, as at 76, and externally threaded at its other end to receive nut 78 in a manner similar to drive and feed sprockets 28 and 29. And as illustrated in FIG. 5, since upward and downward movement to and from the pipe occurs between the torque flange assembly 15 and the torque tube 23, suitable rollers 80 are provided to reduce friction therebetween and the entire flange assembly may be enclosed by grease seals 81 near the torque tube and 82 near the bifurcated flange 47.

As the power flange assembly operates to rotate and feed the cutter towards the pipe, the periphery of the cutter can be guided by a plurality of suitable bearing means (four shown) as ball bearings 83, 84, 85 and 86, provided in the nipple 17. While these bearing means are shown in contact with the periphery of the cutter, they may be spaced a slight distance therefrom to permit movement of the cutter as may be desired to prevent binding of the cutter during operation.

In the operation of the machine, such as on pipe 12 under working pressure and after the anchor 24 and the nipple 17 have been suitably affixed thereto, it is usual to provide the nipple 17 with a valve 18 which can be utilized to contain the fluid under pressure from pipe 12 after the coupon has been cut. This valve can take any convenient form such as the type of valve known in the art as a goggle plate or, as illustrated partially in FIGS. 1 and 2, as a sandwich type valve such as shown in copending application Serial No. 703,678, filed December 18, 1957. Any valve having a full opening bore can be used. When the cutter 13 has completed its operation as shown in FIG. 2, it, together with the torque tube and coupon attached thereto are retracted after which valve 18 can be closed. The tapping machine can then be removed from the valve. This retraction can be accomplished by pulling on the torque tube and/or on the drive and feed shafts, clevises 90 being provided for that purpose.

From the above description, it can be seen that there has been provided a tapping machine having a cutter, the torque reaction of which is transmitted to the coupon 11 upon which it is actually mounted for operation. Thus little or no torque or pulling and feeding stresses are taken up by the nipple or shell and while there has been illustrated herein a particular manner in which the cutter is operated, i.e., by the power flange assembly 14 and the torque flange assembly 15, it is to be understood that any suitable driving and feeding mechanism may be utilized commensurate with its ability to be anchored on an anchor and torque member.

And while there has been illustrated a tapping machine disposed at an angle of approximately 60° with respect to the pipe 12, obviously, the machine can be disposed at right or other angles thereto, it being an important feature of this invention that the cutter 13 does not need a pilot or starter cutter in any angular position of the tapping machine since the bearing means 83, 84, 85 and 86 perform the function of guiding the cutter through the coupon cutting operation.

From the above description, it can also be seen that the anchor mechanism of this invention may be utilized for retracting the coupon after it has been cut from the pipe and that conventional retracting mechanisms usually found on starter or pilot cutters are eliminated.

Wherein, the various parts of this invention have been referred to as located in a right or left or an upper or lower or an inward or outward position, it will be understood that this is done solely for the purpose of facilitating description and that such references relate only to the relative positions of the parts as shown in the drawings.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A tapping machine for cutting a coupon from a container having fluid under pressure therein comprising, means defining an annular cutter, an elongate torque transmitting member mounted coaxially with the cutter and adapted to be anchored to the coupon to be cut, drive means connected to the cutter to rotate the same and having a non-rotatable but longitudinally movable connection with the torque member whereby at least some of the torque resulting from rotating the cutter is transmitted to the torque member and thence to the coupon, and means for feeding the cutter longitudinally of the torque member.

2. The machine of claim 1 wherein the feeding means includes feed screw means connected to the torque member and having a connection with the cutter so that upon rotation of the feed screw means, the longitudinal feeding stresses will also be transmitted to the coupon.

3. A hot tapping machine for cutting a coupon from a container comprising an annular cutter, an elongate torque member and a feed screw internally of the cutter and parallel to the central axis of the cutter, means for anchoring the torque member and the feed screw to the coupon to be cut, cutter support means having a sliding non-rotatable connection with the torque member and connected to the cutter to permit the latter to rotate about the torque member, means for rotating the cutter, a nut on the feed screw and having a connection with the cutter support means so that relative rotation between the nut and feed screw causes the cutter to advance toward the coupon to be cut, and means for causing said relative rotation.

4. A hot tapping machine for cutting a coupon from a container comprising an anchor adapted to be connected to the coupon, an elongate torque member non-rotatably connected to the anchor, a pair of parallel spaced apart plates extending transversely of the torque member means providing a connection between the plates and torque member permitting the plates to move longitudinally of the torque member but limiting relative rotation therebetween, an annular cutter about the torque member having cutting elements at its end adjacent the anchor and an inturned flange spaced from such end and disposed between said plates which thereby rotatably support the cutter, means carried by at least one of the plates for rotating the cutter, and means for feeding the plates and cutter longitudinally along the torque member.

5. The machine of claim 4 wherein the feeding means includes feed screw having a connection with the anchor, a nut on the feed screw means and situated between said plates, and means for causing relative rotation between the nut and feed screw.

6. The machine of claim 5 wherein the torque member is square in cross section and fits into a square opening in said plates to provide the non-rotative connection therebetween.

7. The machine of claim 4 wherein said elongated member is a tube and wherein means are provided forming a releasable connection between the tube and anchor, and a linkage inside said tube to operate said releasable connection, the linkage being accessible for operation from the end of the tube opposite the end connected to said anchor.

8. A tapping machine for cutting a coupon from a container having fluid under pressure therein comprising, means defining a cutter, means rotatably driving the cutter and feeding the same toward the container to cut the coupon therefrom, and means comprising an anchor and a torque tube non-rotatably connected together and disposed centrally of the cutter, means providing a connection between the torque tube and rotatably driving means so that the torque generated by the driving means rotating the cutter is transferred to the torque tube, the anchor being fixed to the coupon to be cut, and a fluid tight housing connected to the container to form a fluid tight chamber therewith and containing said cutter anchor and at least a portion of the torque tube.

9. In a hot tapping machine for cutting a coupon from a container wherein the container has a side-branch conduit connected thereto to surround the coupon, a fluid tight housing adapted to be connected to the conduit, an annular cutter within the housing, a torque member coaxial with the cutter and extending from the housing at one end and having its other end adapted to be anchored to the coupon to be cut, drive means having a driving connection with the cutter to rotate the same and a slidable non-rotatable connection with the torque member transmitting a substantial part of torque for rotating the cutter via the torque member to the coupon to be cut, and means for feeding the cutter along the torque member toward the coupon.

10. The machine of claim 9 wherein an anchor is provided to be fixedly connected to the coupon and wherein the torque member has a fastenable connection with the anchor so that the anchor can be connected to the coupon, then the housing mounted on the conduit and then the torque member connected to the anchor.

11. The machine of claim 9 wherein the drive means includes a drive shaft extending from the fluid tight housing and having a sliding seal therewith, and motor means connected to the drive shaft to rotate the same.

12. A tapping machine for cutting a coupon from a container comprising, a housing having one end closed and the other open so as to be adapted to be mounted on the container to form therewith a fluid tight enclosure around the coupon to be cut, an annular cylindrical cutter within the housing having cutting elements at its end adjacent the open end of the housing and an inturned ring gear at its other end, a pair of plates disposed on opposite sides of the ring gear to support the cutter and yet permit it to rotate, a torque tube having a sliding non-rotating connection through the plates coaxial with the cutter and also extending through the closed end of the housing, an anchor adapted to be fixed to the coupon, fastening means providing a non-rotative fastenable connection between the anchor and the torque tube, a linkage extending through the torque tube to the fastening means to actuate the latter, a pair of feed screws connected at one end with the anchor and having their other end extending from the housing, a nut on each of the feed screws and disposed between said pair of plates, a drive gear between the plates meshing with said ring gear, a shaft connected to the drive gear and extending from the housing, and motor means connected to the shaft and to the feed screws to rotate the same.

13. In a hot tapping machine, means adapted to be connected to a coupon to be cut and to convey torque thereto, a cutter, drive means for actuating the cutter and connected between the cutter and torque conveying means to cause the cutter to cut the coupon, the drive means having a torque transmitting connection with the torque conveying means transmitting a substantial part of the torque resulting from actuation of the cutter to the coupon.

14. A tapping machine for cutting a coupon from a container having fluid under pressure therein comprising means defining a cutter; means rotatably driving the cutter and feeding the same toward the container to cut the coupon therefrom; an anchoring means rigidly attachable to the coupon; and a means for transmitting force, extending through the cutter and attached to the anchoring means, disposed between the driving and feeding means and the anchoring means for transmitting a substantial part of the torque and feeding stresses from the cutter to the anchoring means.

15. A tapping machine for cutting a coupon from a container having fluid under pressure therein comprising means defining an annular cutter; means rotatably driving the cutter and feeding the same toward the container to cut the coupon therefrom; connecting means comprising an anchor rigidly attachable to the coupon and a torque tube extending through the cutter, the anchor and torque tube being coaxial with the cutter; and force transmitting means disposed between the driving and feeding means and the connecting means transmitting a substantial part of torque and feeding stresses of the cutter to the connecting means, therethrough to the anchor, and thence to the coupon.

16. In a hot tapping machine for cutting a coupon from a container, a fluid-tight housing adapted to be mounted on the container to surround the coupon to be cut; an annular cutter within the housing; a torque member extending through the cutter; means connected between the torque member and cutter for rotating the cutter and feeding it toward the coupon, transmitting a substantial part of the torque required to rotate the cutter to the torque member; an anchor disposed with the cutter and adapted to be fixed to the coupon to be cut; and a detachable connection between the torque member and anchor adapted to connect the torque member and anchor together after the housing is mounted on the container.

17. A tapping machine for cutting a coupon from a container having fluid under pressure therein comprising means defining an annular cutter; driving means connected to the cutter for rotating the cutter and feeding the cutter toward the coupon to be cut; anchor means disposed interiorly of the cutter and adapted to be fixedly connected to the coupon; and a force transmitting connection between the feeding means and anchor means transmitting a substantial part of the longitudinal feeding stresses from the feed means to the anchor means, and thence transmitting the stresses to the coupon; the anchor means including a yoke adapted to be anchored to the coupon, said feeding means including a pair of feed screws anchored to opposite ends of the yoke, a nut on each of the feed screws, means connecting between the nuts and cutter permitting the cutter to rotate about the nut but limiting the longiudinal movement relative thereto, and means causing relative rotation between the feed screws and nuts.

References Cited in the file of this patent

UNITED STATES PATENTS

| 887,308 | Bryan | May 12, 1908 |
| 2,115,992 | Koppl | May 3, 1938 |
| 2,881,643 | Haade | Apr. 14, 1959 |

FOREIGN PATENTS

| 115,003 | Australia | Apr. 9, 1942 |